United States Patent
Park et al.

(10) Patent No.: US 8,223,695 B2
(45) Date of Patent: Jul. 17, 2012

(54) INITIAL ACCESS CONTROL METHOD BETWEEN PERSONAL SUBSCRIBER STATION AND RADIO ACCESS STATION IN MOBILE COMMUNICATION SYSTEM

(75) Inventors: Chul Park, Daejeon (KR); Chul-Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 544 days.

(21) Appl. No.: 12/517,184

(22) PCT Filed: Nov. 8, 2007

(86) PCT No.: PCT/KR2007/005629
§ 371 (c)(1),
(2), (4) Date: Jun. 1, 2009

(87) PCT Pub. No.: WO2008/066262
PCT Pub. Date: Jun. 5, 2008

(65) Prior Publication Data
US 2010/0054186 A1    Mar. 4, 2010

(30) Foreign Application Priority Data
Dec. 1, 2006   (KR) .................. 10-2006-0120745
Jul. 6, 2007   (KR) .................. 10-2007-0067990

(51) Int. Cl.
*H04W 74/00*   (2009.01)
(52) U.S. Cl. ........................... 370/328; 370/230
(58) Field of Classification Search .......... 370/252, 370/328, 338, 350, 395.2, 395.3, 476, 230, 370/471
See application file for complete search history.

(56) References Cited

U.S. PATENT DOCUMENTS

| | | | |
|---|---|---|---|
| 7,664,076 B2 * | 2/2010 | Kim et al. ............... | 370/335 |
| 2004/0174845 A1 | 9/2004 | Koo et al. | |
| 2006/0094366 A1 | 5/2006 | Cho et al. | |

(Continued)

FOREIGN PATENT DOCUMENTS

JP    2006-238451    9/2006

(Continued)

OTHER PUBLICATIONS

IEEE Standards—802.16™, IEEE Standard for Local and metropolitan area networks, Part 16: Air Interface for Fixed Broadband Wireless Access Systems, Institute of Electrical and Electronics Engineers, Inc., (2004).

(Continued)

*Primary Examiner* — Brian D Nguyen
(74) *Attorney, Agent, or Firm* — Jefferson IP Law, LLP

(57) ABSTRACT

The present invention relates to an initial access based control method between a personal subscriber station and a radio access station in a mobile communication system. The present invention includes: a) selecting an initial access method corresponding to a first field value of a first parameter included in a first downlink channel descript message received from the radio access station; b) generating a first ranging request message corresponding to the initial access method; and c) transmitting the first ranging request message to the radio access station. The present invention guarantees mutual compatibility with the existing broadband wireless access system and realizes various initial access methods between the subscriber station and the radio access station.

14 Claims, 4 Drawing Sheets

U.S. PATENT DOCUMENTS

| | | | |
|---|---|---|---|
| 2006/0194579 A1 | 8/2006 | Leung et al. | |
| 2006/0234742 A1* | 10/2006 | Kim et al. | 455/513 |
| 2007/0032255 A1* | 2/2007 | Koo et al. | 455/512 |
| 2007/0076684 A1* | 4/2007 | Lee et al. | 370/350 |
| 2007/0082621 A1* | 4/2007 | Lee et al. | 455/69 |
| 2007/0211744 A1* | 9/2007 | Crocker et al. | 370/431 |
| 2008/0056306 A1* | 3/2008 | Boontor | 370/503 |

FOREIGN PATENT DOCUMENTS

| | | |
|---|---|---|
| KR | 1020050100859 | 10/2005 |
| WO | WO-02/095960 A2 | 11/2002 |
| WO | WO-2006/085286 A1 | 8/2006 |

OTHER PUBLICATIONS

IEEE Standards—802.16e™, IEEE Standard for Local and metropolitan area networks, Part 16: Air Interface for Fixed Broadband Wireless Access Systems, Amendment 2: Physical and Medium Access Control Layers for Combined Fixed and Mobile Operation in Licensed Bands adn Corrigendum 1, Institute of Electrical and Electronics Engineers, Inc., (2004).

Korean Office Action for Application No. 9-5-2009-008908011, dated Feb. 26, 2009.

Korean Office Action for Application No. 10-2007-0067990, dated Feb. 26, 2009.

\* cited by examiner

[Fig. 1]
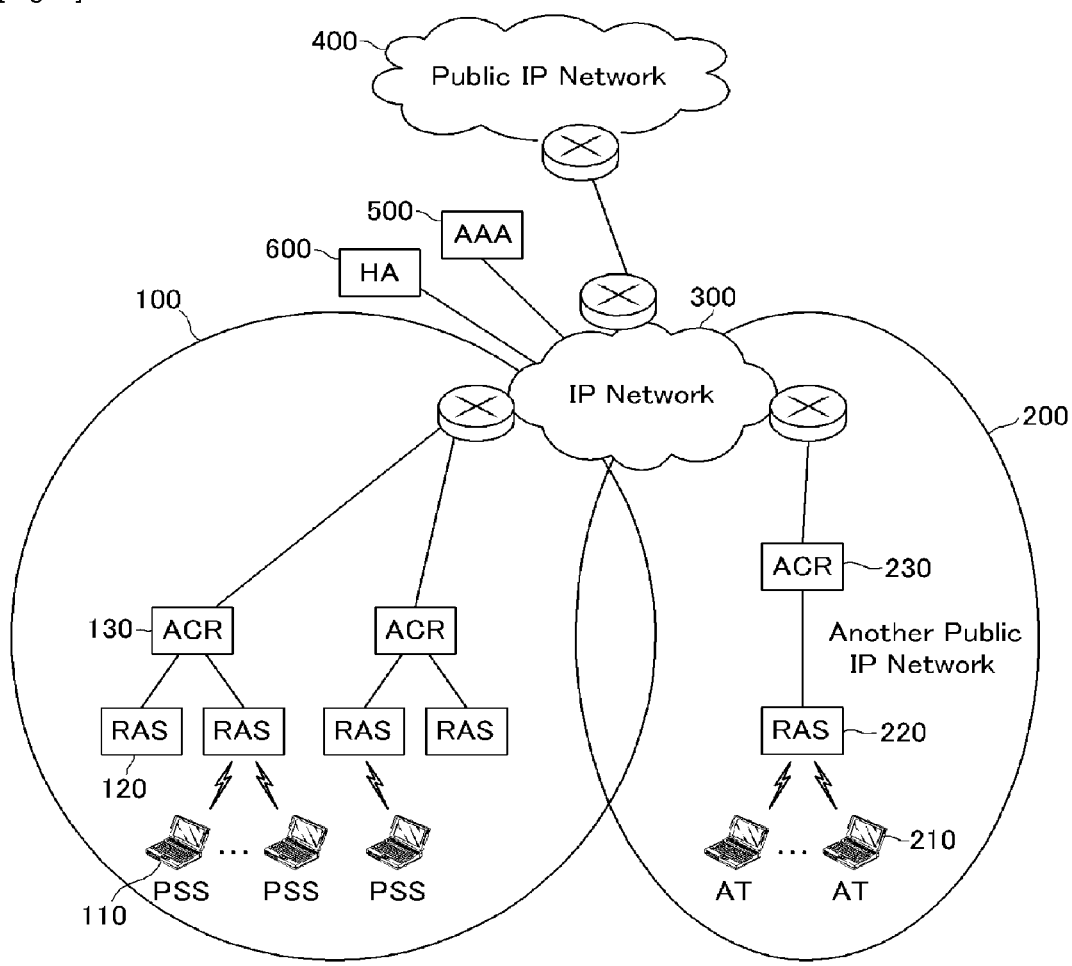

[Fig. 2]
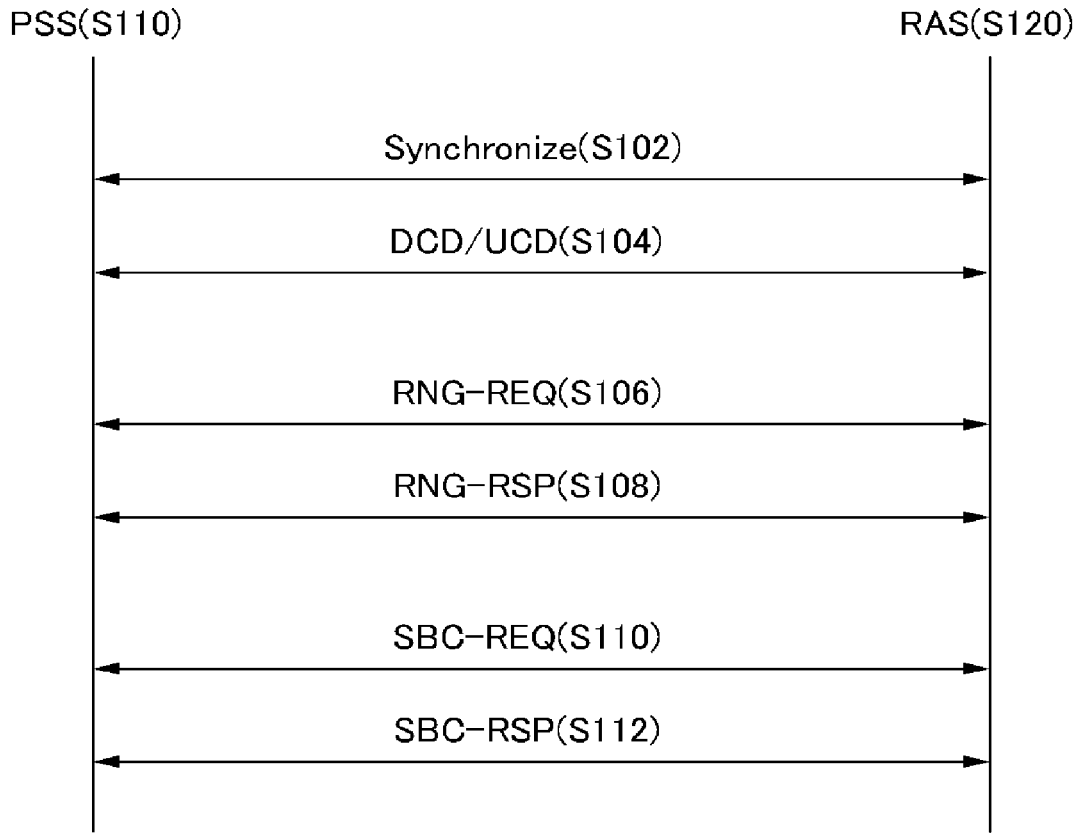
[Fig. 3]
| Field | Type | Length | Value |
|---|---|---|---|
| Control message type | - | 1 | 0X01 |
| Reserved | - | 1 | 0X00 |
[Fig. 4]
| Field | Type | Length | Value |
|---|---|---|---|
| Control message type | - | 1 | 0X04 |
| Reserved | - | 1 | 0X00 |

[Fig. 5]

| Field | Type | Length | Value |
|---|---|---|---|
| Control message type | - | 1 | 1 |
| Access supported flag | - | 1 | Variable |

[Fig. 6]

| Field | Type | Length | Value |
|---|---|---|---|
| Control message type | - | 1 | 0X04 |
| Access supported flag | - | 1 | Variable |

[Fig. 7]
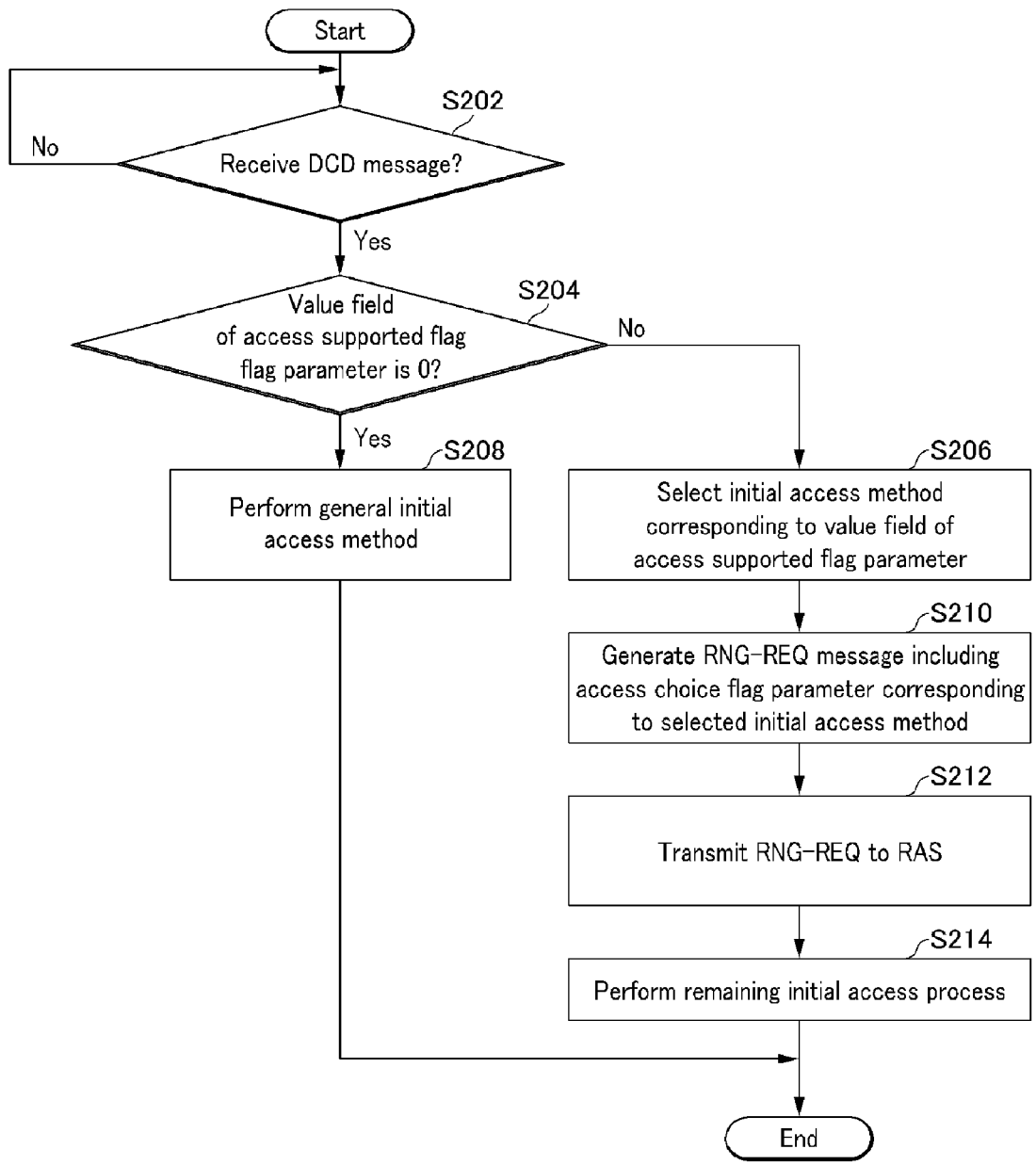

US 8,223,695 B2

INITIAL ACCESS CONTROL METHOD BETWEEN PERSONAL SUBSCRIBER STATION AND RADIO ACCESS STATION IN MOBILE COMMUNICATION SYSTEM

RELATED APPLICATIONS

This application is a 35 U.S.C. §371 national stage filing of PCT Application No. PCT/KR2007/005629 filed on Nov. 8, 2007, which claims priority to, and the benefit of, Korean Patent Application No. 10-2006-0120745 filed on Dec. 1, 2006 and Korean Patent Application No. 10-2007-0067990 filed on Jul. 6, 2007. The contents of the aforementioned applications are hereby incorporated by reference.

TECHNICAL FIELD

The present invention relates to an initial access type control method between a personal subscriber station and a radio access station in a mobile communication system, and in particular, it relates to an initial access type control method for realizing various initial access methods between a personal subscriber station and a radio access station in a broadband wireless access system.

BACKGROUND ART

Various standards have been proposed for the broadband wireless access system, and particularly the IEEE 802.16-2004 and IEEE 802.16e-2005 standards have been approved as the international standards for a portable Internet system. The international standardization group belonging to the IEEE 802.16 is currently standardizing the broadband wireless access system for better performance.

The conventional wireless LAN system based on the IEEE 802.11 standard provides a data communication method available for radio communication within a short range with reference to a fixed access point, which however does not provide mobility of a subscriber station but supports a local area data communication not in a cable manner but in a wireless manner.

The broadband wireless access system defined by the IEEE 802.16-2004 and IEEE 802.16e-2005 standards guarantees mobility and provides a seamless data communication service when a subscriber station moves from a cell controlled by a radio access station to another cell controlled by another radio access station.

The IEEE 802.16-2004 and IEEE 802.16e-2005 standards support the metropolitan area network (MAN) that covers the middle-level areas between the LAN and the WAN.

Therefore, the broadband wireless access system supports the handover of the subscriber station in a like manner of the mobile communication service, and allocates a dynamic IP address as the subscriber station moves.

The international standardization group belonging to the IEEE 802.16 is studying a better wireless portable Internet system with further improved performance compared to the existing broadband wireless access system. Another initial access method between a subscriber station and a radio access station differing from the existing initial access process is required so as to realize a better wireless portable Internet system. Accordingly, a method for realizing an initial access process through various initial access methods between the subscriber station and the radio access station is needed while guaranteeing mutual compatibility with the existing broadband wireless access system.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an initial access control method between a personal subscriber station and a radio access station having advantages of performing an initial access process through a plurality of different initial access methods.

Technical Solution

In one aspect of the present invention, an initial access based control method by a personal subscriber station with a radio access station in a mobile communication system includes: a) selecting an initial access method corresponding to a first field value of a first parameter included in a first downlink channel descript message received from the radio access station; b) generating a first ranging request message corresponding to the initial access method; and c) transmitting the first ranging request message to the radio access station.

In another aspect of the present invention, an initial access based control method by a radio access station with a personal subscriber station in a mobile communication system includes: a) the radio access station transmitting a first downlink channel descript message including a first parameter for indicating a first initial access method from among a plurality of initial access methods to the synchronized personal subscriber station; and b) transmitting a ranging response message for notifying successful receipt of the first ranging request message to the personal subscriber station when receiving the first ranging request message corresponding to the first initial access method from the personal subscriber station.

In another aspect of the present invention, an initial access based control method by a personal subscriber station using a first message with a radio access station in a mobile communication system is provided. The first message includes a first parameter defined by a length field and a value field, the value field of the first parameter corresponds to a value field of a second parameter included in a downlink channel descript message received from the radio access station, and the value fields of the first and second parameters determine one of the initial access methods that can be set.

Advantageous Effects

According to the present invention, mutual compatibility with the existing broadband wireless access system is guaranteed, and an initial access process through various initial access methods between the subscriber station and the radio access station can be performed.

BRIEF DESCRIPTION OF THE DRAWINGS

FIG. 1 shows a broadband wireless access system according to an exemplary embodiment of the present invention.

FIG. 2 shows part of a general initial access process between a personal subscriber station and a radio access station.

FIG. 3 shows a general DCD message structure defined by the IEEE 802.16 and IEEE 802.16e-2005 standards.

FIG. 4 shows a general RNG-REQ message defined by the IEEE 802.16 and IEEE 802.16e-2005 standards.

FIG. 5 shows a DCD message structure according to an exemplary embodiment of the present invention.

FIG. 6 shows a RNG-REQ message structure according to an exemplary embodiment of the present invention.

FIG. 7 shows a flowchart for an initial access control process by a personal subscriber station 110 according to an exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

An initial access type control method between a personal subscriber station and a radio access station in a mobile communication system according to an exemplary embodiment of the present invention will now be described with reference to drawings.

FIG. 1 shows a broadband wireless access system according to an exemplary embodiment of the present invention.

As shown in FIG. 1, the broadband wireless access system 100 includes a personal subscriber station (PSS) 110, a radio access station (RAS) 120, and an access control router (ARC) 130.

The personal subscriber station 110 is a terminal used by a subscriber so as to receive a portable Internet service, it has mobility, and transmits/receives radio channels following the radio access standard in the 2.3 GHz bandwidth frequency so as to access the radio access station 120 and transmit/receive high-speed packet data.

The radio access station 120 is a device for connecting a wireless network and a cable network, and provides a radio packet data service to the personal subscriber station 110 from a cable network end through a wireless interface. That is, the radio access station 120 performs an initial access function, an inter-sector handover control function, and a quality of service (QoS) control function, receives a radio signal from the personal subscriber station 110, transmits the radio signal to the access control router 130, and it also converts various types of information provided by the access control router 130 into radio signals and transmits the radio signals to the personal subscriber station 110.

The access control router 130 is connected to a plurality of radio access stations 120 and an IP-based cable network to control the personal subscriber station 110 and the radio access station 120 and route the IP packet, and functions as a foreign agent of a mobile IP. In this instance, one packet access router area becomes one IP subnet. The foreign agent function registers the user or cancels the registration so that the user may move from the current network to another network while maintaining the Internet access when a packet-based Internet access service and a roaming service are provided.

An authentication, authorization, and accounting (AAA) server 500 is connected to the access control router 130 through an IP network 300 and authenticates the user and the personal subscriber station 110, verifies a service right, and bills for the service usage so that the registered user may access the public IP network 400 and receive an IP-based service. The AAA server 500 uses the diameter protocol that is currently standardized by the Internet Engineer Task Force (IETF). The diameter protocol enables authentication by an inter-server link, right verification, and sending billing information.

A home agent (HA) 600 performs a routing process for transmitting a packet by a foreign packet data service server including the public IP network 400.

The broadband wireless access system 100 shown in FIG. 1 can interwork with another broadband wireless access system 200 including a personal subscriber station 210, a radio access station 220, and an access control router 230 through the IP network 300, and can interwork with a cellular network or a wireless LAN through the public IP network 400, and can include at least one access control router 130. Also, one access control router 130 can cover at least one radio access station 120, and a plurality of personal subscriber stations 110 can be connected to one radio access station 120 to receive a service. When moving to a new cell from the cell controlled by the radio access station 120, the personal subscriber station 110 can receive the service provided by the previous cell.

FIG. 2 shows part of a general initial access process between a personal subscriber station and a radio access station.

When the personal subscriber station 110 is turned on, the personal subscriber station 110 is synchronized with the radio access station 120 controlling the personal subscriber station 110 (S102).

After the synchronization in step S102, the radio access station 120 transmits an uplink channel descript (UCD) message and a downlink channel descript (DCD) message to the personal subscriber station 110 (S104).

In this instance, the UCD message and the DCD message are respectively a media access control layer message for describing a physical layer characteristic for the uplink and a media access control layer message for describing a physical layer characteristic for the downlink, and they are broadcasting messages that are transmitted by the radio access station 120 to all the personal subscriber stations included in the area that the transmission signal of the radio access station 120 reaches.

The UCD and DCD messages include information used for initially accessing the radio access station 120 by the personal subscriber station 110, including information on accessing the radio access station 120 and burst profile information. A downlink MAP (DL-MAP) message and an uplink MAP (UL-MAP) message include information on the band allocation and frame structure dynamically allocated to the personal subscriber station 110 by the radio access station 120, and also includes information for designating the location and structure of a ranging subchannel.

The personal subscriber station 110 stores information on a ranging code to be used for initial ranging, information on the modulation method, information on the coding scheme, and information on the ranging channel and the ranging slot based on the uplink channel descript message and the downlink channel descript message that are received from the radio access station 120 through step S104.

The personal subscriber station 110 randomly selects one of the stored ranging slots, and transmits a ranging request (RNG-REQ) message for transmitting the selected ranging code to the radio access station 120 through the ranging slot.

On receiving the ranging request code from the personal subscriber station 110, the radio access station 120 transmits a ranging response (RNG-RSP) message for indicating successful receipt of the ranging request code to the personal subscriber station 110. In this instance, the RNG-RSP message transmitted to the personal subscriber station 110 by the radio access station 120 includes power offset information of the personal subscriber station calculated by the radio access station 120 based on the ranging request code received from the personal subscriber station 110, timing offset information, and data transmitting/receiving frequency offset information, and the personal subscriber station 110 transmits data to the subsequent radio access station 120 based on the information. On checking that the ranging request caused by the ranging code is successfully performed by the RNG-RSP message, the personal subscriber station transmits the ranging request (RNG-REQ) message to the radio access station (S106), and the radio access station transmits a corresponding RNG-RSP message to the personal subscriber station (S108).

The personal subscriber station 110 having received the RNG-RSP message through step S108 transmits a subscriber station basic capability request (SBC-REQ) message including various parameters and authentication information supportable by the personal subscriber station 110 to the radio access station 120 so as to transmit/receive data to/from the radio access station 120 (S110).

The radio access station 120 having received the SBC-REQ message from the personal subscriber station 110 through step S110 compares the parameters and authentication method supported by the personal subscriber station 110 and included in the SBC-REQ message and the parameters and authentication method supported by the radio access station 120. The radio access station 120 determines the parameter and authentication method to be used by the personal subscriber station 110 so as to transmit/receive data to/from the radio access station 120, and transmits a subscriber station basic capability response (SBC-RSP) message including the parameter and authentication method to the personal subscriber station 110 (S112).

Through steps S110 and S112, the personal subscriber station 110 finishes a basic capability negotiation operation with the radio access station 120, and performs an authentication procedure with the radio access station 120.

In the general initial access process between the personal subscriber station 110 and the radio access station 120 defined by the IEEE 802.16 and IEEE 802.16e standards that are described with reference to FIG. 2, the management messages including the UCD, DCD, RNG-REQ, RNG-RSP, SBC-REQ, and SBC-RSP that are transmitted/received between the personal subscriber station 110 and the radio access station 120 include a plurality of parameters.

From among them, the DCD and RNG-REQ messages include a predetermined parameter that is not defined and that can be substituted with another parameter having the same length, which will be described with reference to FIG. 3 and FIG. 4. The DCD and RNG-REQ messages include further parameters than those shown in FIG. 3 and FIG. 4, and FIG. 3 and FIG. 4 selectively show the parts that are related to the exemplary embodiment of the present invention.

FIG. 3 shows a general DCD message structure defined by the IEEE 802.16 and IEEE 802.16e-2005 standards, and FIG. 4 shows a general RNG-REQ message defined by the IEEE 802.16 and IEEE 802.16e-2005 standards.

As shown in FIG. 3 and FIG. 4, the general DCD and RNG-REQ messages include a control message type and a reserved parameter defined by a type field, a length field, and a value field. Here, the value of the length field is indicated by the bytes.

The control message type parameter included in the DCD and RNG-REQ messages has values for indicating that the control messages shown in FIG. 3 and FIG. 4 respectively indicate the DCD message and the RNG-REQ message.

The reserved parameter included in the DCD and RNG-REQ messages has a length value, and it is not defined in a specific manner. That is, the personal subscriber station 110 and the radio access station 120 generate no reaction to the reserved parameter included in the DCD and RNG-REQ messages.

The value field of the reserved parameter is generally set as 0 and the length has 1 byte, and hence, the value field is given as "0x00".

Various initial access methods including the existing initial access method can be realized by changing the reserved parameter included in the general DCD and RNG-REQ messages shown in FIG. 3 and FIG. 4, which will now be described with reference to FIG. 5 and FIG. 6.

FIG. 5 shows a DCD message structure according to an exemplary embodiment of the present invention, and FIG. 6 shows a RNG-REQ message structure according to an exemplary embodiment of the present invention.

Referring to FIG. 5, the DCD message is provided by substituting the reserved parameter included in the general DCD message shown in FIG. 3 with an access supported flag parameter. In this instance, the access supported flag parameter has the same length field value as that of the reserved parameter included in the general DCD message, and hence, the DCD message according to the exemplary embodiment of the present invention has the same size as that of the general DCD message.

The RNG-REQ message according to the exemplary embodiment of the present invention shown in FIG. 6 is generated by substituting the reserved parameter included in the general RNG-REQ message shown in FIG. 4 with an access choice flag parameter. In this instance, the access choice flag parameter has the same length field value as that of the reserved parameter included in the general DCD message, and hence, the DCD message according to the exemplary embodiment of the present invention has the same size as that of the general DCD message.

The value fields of the access supported flag parameter included in the DCD message shown in FIG. 5 and the access choice flag parameter included in the RNG-REQ message shown in FIG. 6 can have values from 0 to 255 corresponding to the 1-byte value field.

The respective value fields of the access supported flag parameter from 0 to 255 correspond to all the initial access methods supportable by the radio access station 120 transmitting the DCD message. Also, respective value fields of the access choice flag parameter from 0 to 255 correspond to all the initial access methods that can be attempted by the personal subscriber station 110 to the radio access station 120 transmitting the RNG-REQ message.

That is, the initial access methods corresponding to the value field of the access supported flag parameter and the access choice flag parameter from 0 to 255 can be established in a new manner, and hence, initial access methods up to 256 different types can be realized between the personal subscriber station 110 and the radio access station 120.

In this instance, when the value fields of the access supported flag parameter and the access choice flag parameter are respectively 0, the personal subscriber station 110 and the radio access station 120 can be set to perform the initial access process shown in FIG. 2 by using the same initial access method as that using the general DCD and RNG-REQ messages shown in FIG. 3 and FIG. 4 by using the DCD and RNG-REQ messages according to the exemplary embodiment of the present invention. The above-noted setting is to make the DCD and RNG-REQ messages according to the exemplary embodiment of the present invention be compatible with the general DCD and RNG-REQ messages.

The DCD message according to the exemplary embodiment of the present invention shown in FIG. 5 is a control message that is generated by the radio access station 120 and is transmitted to the personal subscriber station 110, and the RNG-REQ message according to the exemplary embodiment of the present invention shown in FIG. 6 is a control message that is generated by the personal subscriber station 110 and is transmitted to the radio access station 120. Because of this, it is required that the personal subscriber station 110 stores a plurality of initial access methods corresponding to the value field of the access supported flag parameter included in the DCD message according to the exemplary embodiment of the present invention transmitted from the radio access station 120, generates a RNG-REQ message including the access choice flag parameter having the corresponding value field, and transmits the RNG-REQ message to the radio access station 120. Also, it is required that the radio access station 120 generates a DCD message including the access supported flag parameter, senses the access choice flag parameter included in the RNG-REQ message transmitted from the personal subscriber station 110, and performs the subsequent initial access process corresponding to the value field of the access choice flag parameter. That is, it is required that the personal subscriber station 110 and the radio access station 120 for performing the initial access process through various initial access methods through the DCD and RNG-REQ messages according to the exemplary embodiment of the present invention are developed from the personal subscriber station or the radio access station used for the general broadband wireless access system.

A general personal subscriber station that does not support the DCD and RNG-REQ messages according to the exemplary embodiment of the present invention only recognizes the access supported flag parameter included in the DCD message according to the exemplary embodiment of the present invention received from the radio access station 120 as a reserved parameter, and accordingly performs the initial access process through the general initial access method.

An initial access process between a personal subscriber station 110 and a radio access station 120 using DCD and RNG-REQ messages according to the exemplary embodiment of the present invention shown in FIG. 5 and FIG. 6 will now be described with reference to FIG. 7.

FIG. 7 shows a flowchart for an initial access control process by a personal subscriber station 110 according to an exemplary embodiment of the present invention.

The personal subscriber station 110 determines whether it has received a DCD message from the radio access station 120 (S202).

The personal subscriber station 110 having received the DCD message from the radio access station 120 according to the determination result of step S202 determines whether the value field of the access supported flag parameter included in the DCD message is 0 (S204).

When not having received the DCD message from the radio access station 120 according to the determination result of step S202, the personal subscriber station 110 repeats step S202 until it receives the DCD message.

When the value field of the access supported flag parameter is not 0 according to the determination result of step S204, the personal subscriber station 110 selects the initial access method corresponding to the value field of the access supported flag parameter (S206).

When the value field of the access supported flag parameter is 0 according to the determination result of step S204, the personal subscriber station 110 determines the received DCD message to be the general DCD message shown in FIG. 3, and performs the initial access process shown in FIG. 2 through the general initial access method (S208).

The personal subscriber station 110 having selected the initial access method corresponding to the value field of the access supported flag parameter through step S206 generates a RNG-REQ message including an access choice flag parameter having the value field corresponding to the selected initial access (S210), and transmits the RNG-REQ message to the radio access station 120 (S212).

The radio access station having received the RNG-REQ message from the personal subscriber station 110 through step S212 generates a corresponding RNG-RSP message and transmits the RNG-RSP message to the personal subscriber station 110, and the personal subscriber station 110 performs the steps after step S110 shown in FIG. 2 (S214).

The initial access type control method between the personal subscriber station and the radio access station in the broadband wireless access system according to the exemplary embodiment of the present invention newly configures a RNG-REQ message corresponding to the DCD message received from the radio access station to thereby realize the initial access process through 256 various initial access methods between the personal subscriber station and the radio access station.

Also, the new DCD and RNG-REQ messages have the same size and number of parameters as those of the general DCD and RNG-REQ messages, and hence, it guarantees 256 various initial access methods between the personal subscriber station and the radio access station without using additional radio resources.

Further, the initial access type control method between the personal subscriber station and the radio access station in the broadband wireless access system according to the exemplary embodiment of the present invention guarantees mutual compatibility with the general DCD and RNG-REQ messages supported by a general personal subscriber station that does not support the DCD and RNG-REQ messages according to the exemplary embodiment of the present invention, and hence, it can accept the new initial access methods that can be additionally defined, as well as the general initial access method performed between the personal subscriber station 110 and the radio access station 120.

The above-described embodiments can be realized through a program for realizing functions corresponding to the configuration of the embodiments or a recording medium for recording the program, in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An initial access based control method by a personal subscriber station with a radio access station in a mobile communication system, the method comprising:
   a) selecting an initial access method corresponding to a first field value of a first parameter included in a first downlink channel descript message received from the radio access station;
   b) generating a first ranging request message corresponding to the initial access method; and
   c) transmitting the first ranging request message to the radio access station.

2. The method of claim 1, wherein
the first parameter is an access supported flag parameter, and
the access supported flag parameter is defined by a length field and a value field.

3. The method of claim 2, wherein
the first field is the value field.

4. The method of claim 3, wherein
the first ranging request message generated in b) includes an access choice flag parameter, and
the access choice flag parameter is defined by a length field and a value field.

5. The method of claim 4, wherein
values of the length fields of the access supported flag parameter and the access choice flag parameter are 1 byte, and
the value field is set to be a value between 0 and 255.

6. The method of claim 5, wherein
the personal subscriber station stores different initial access methods corresponding to respective value fields of the access supported flag parameter that are set to be a value between 0 and 255.

7. An initial access based control method by a radio access station with a personal subscriber station in a mobile communication system, the method comprising:
   a) the radio access station transmitting a first downlink channel descript message including a first parameter for indicating a first initial access method from among a plurality of initial access methods to the personal subscriber station; and
   b) transmitting a ranging response message for notifying a successful receipt of a first ranging request message to the personal subscriber station when receiving the first ranging request message corresponding to the first initial access method from the personal subscriber station.

8. The method of claim 7, wherein
the first parameter is an access supported flag parameter, and
the access supported flag parameter is defined by a length field and a value field.

9. The method of claim 8, wherein
the first initial access method is determined by the value field.

10. The method of claim 9, wherein
the first ranging request message includes an access choice flag parameter, and
the access choice flag parameter is defined by a length field and a value field.

11. The method of claim 10, wherein
values of the length fields of the access supported flag parameter and the access choice flag parameter are 1 byte, and
the value field is set to be a value between 0 and 255.

12. The method of claim 11, wherein
the personal subscriber station stores different initial access methods corresponding to respective value fields of the access supported flag parameter that are set to be a value between 0 and 255.

13. An initial access based control method by a personal subscriber station using a first message with a radio access station in a mobile communication system, the method comprising:
   transmitting, by the personal subscriber station, the first message to the radio access station,
   wherein the first message includes a first parameter defined by a length field and a value field,
   wherein the value field of the first parameter corresponds to a value field of a second parameter included in a downlink channel descript message received from the radio access station, and
   wherein the value fields of the first and second parameters determine which of a plurality of initial access methods can be set.

14. The method of claim 13, wherein
the length fields of the first and second parameters are 1 byte, and the value fields of the first and second parameters are set to be a value between 0 and 255.

* * * * *